Patented Nov. 11, 1952

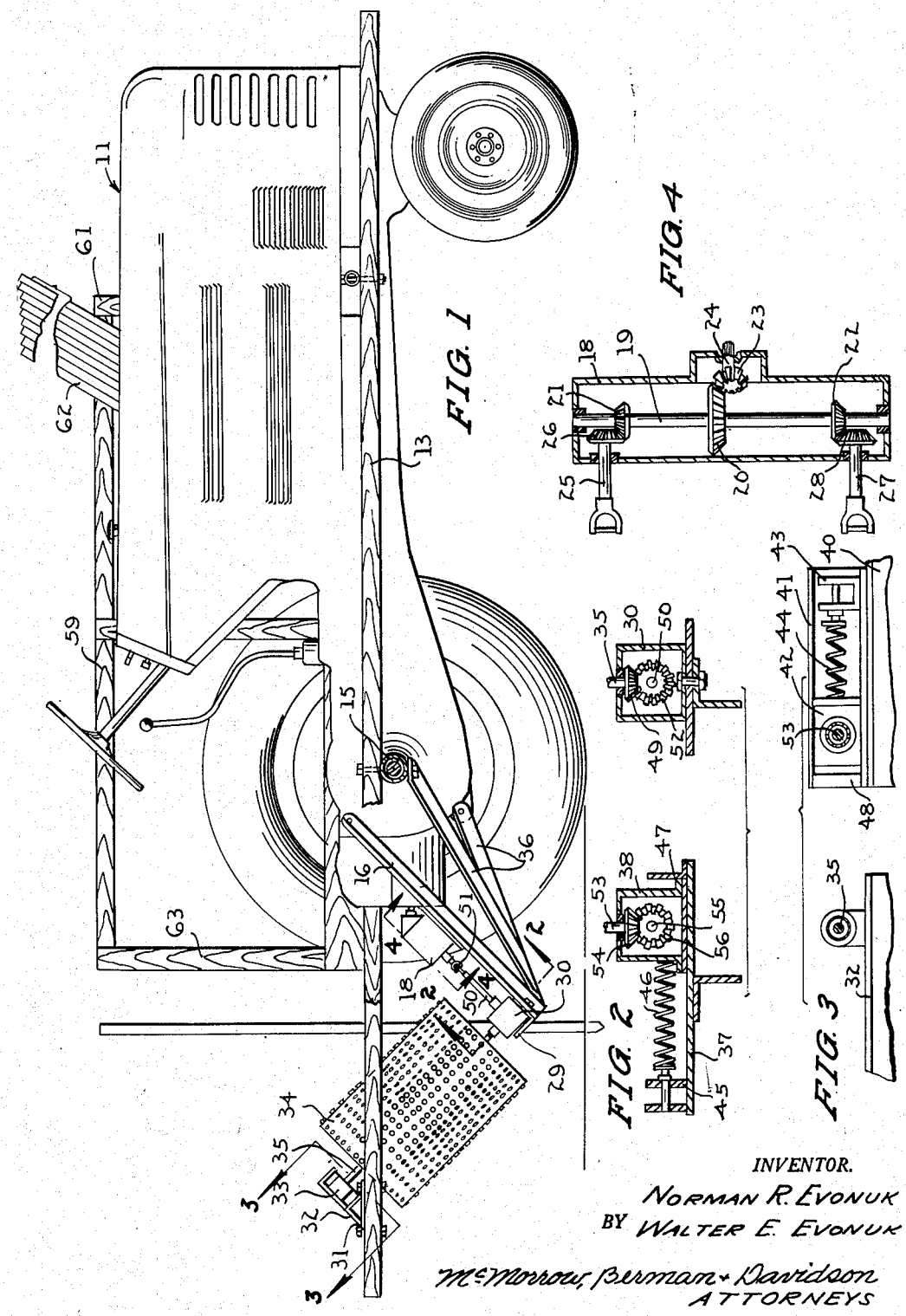
Nov. 11, 1952  N. R. EVONUK ET AL  2,617,627
STAKE SETTER
Filed Nov. 3, 1950  2 SHEETS—SHEET 1
INVENTOR.
NORMAN R. EVONUK
BY WALTER E. EVONUK
McMorrow, Berman & Davidson
ATTORNEYS

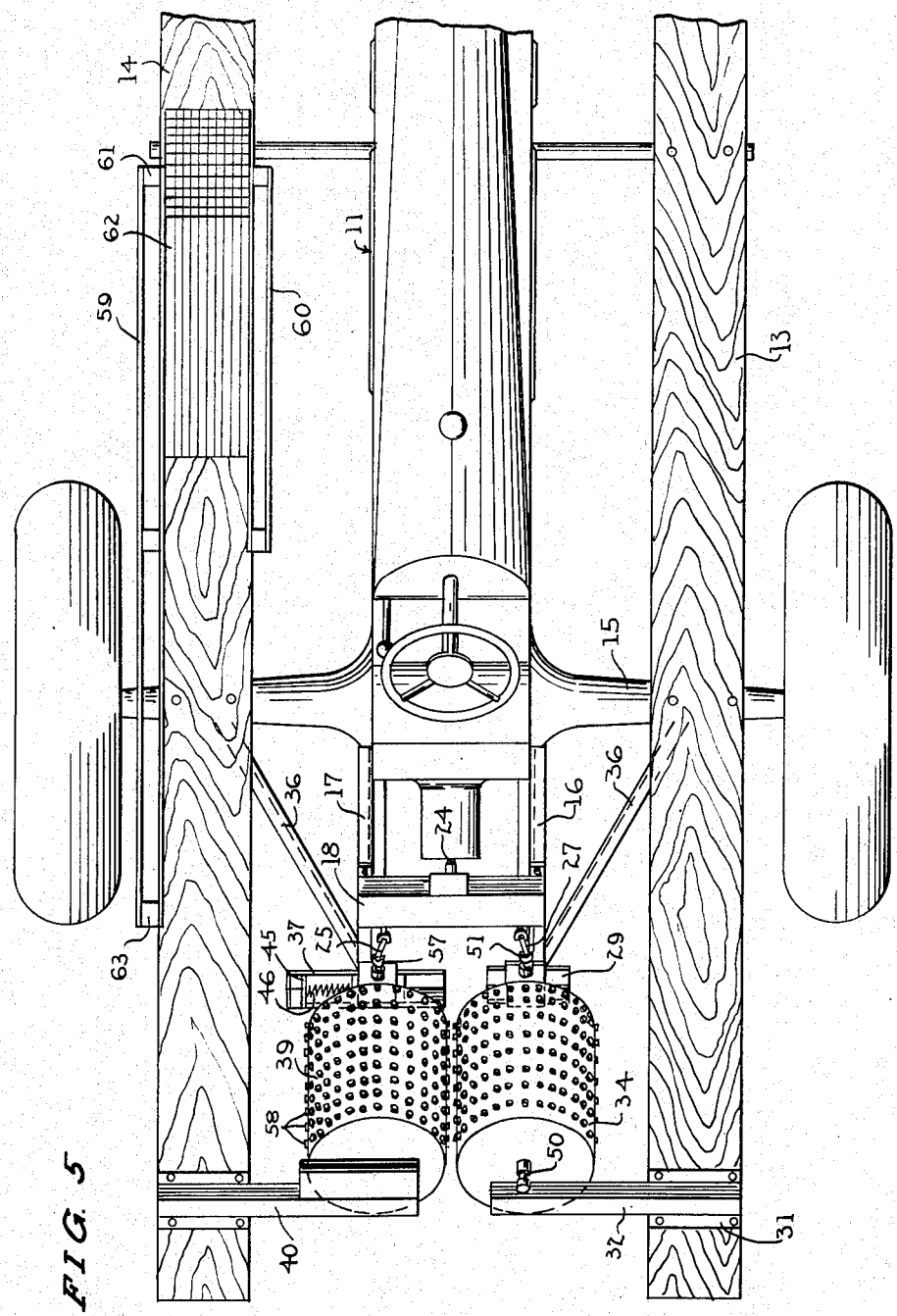

2,617,627

UNITED STATES PATENT OFFICE 2,617,627

STAKE SETTER

Norman R. Evonuk, Springfield, and Walter E. Evonuk, Eugene, Oreg.

Application November 3, 1950, Serial No. 193,893

3 Claims. (Cl. 254—29)

This invention relates to agricultural implements, and more particularly to tractor-mounted, stake-setting equipment.

A main object of the invention is to provide a novel and improved apparatus for setting stakes for vines and similar plants, said apparatus being relatively simple in construction, being suitable for mounting on a tractor, and being very easy to operate.

A further object of the invention is to provide an improved tractor-mounted, stake-setting machine which involves relatively inexpensive parts, which is sturdy in construction, which greatly reduces the cost in setting up stakes for vines and similar plants, and which sets stakes vertically into the ground while the tractor moves forwardly.

Further objects and advantages of the invention will become apparent from the following description and claims, and from the accompanying drawings, wherein:

Figure 1 is a side elevational view of a tractor provided with an improved stake-setting apparatus constructed in accordance with the present invention;

Figure 2 is an enlarged cross-sectional detail view taken on line 2—2 of Figure 1;

Figure 3 is an enlarged cross-sectional detail view taken on line 3—3 of Figure 1;

Figure 4 is an enlarged cross-sectional detail view taken on line 4—4 of Figure 1;

Figure 5 is a top plan view of the tractor of Figure 1.

In raising string beans and similar vines, it is necessary to provide stakes or similar structures upon which the vines may climb.

When stakes are employed, each hill has an individual stake about one inch square and approximately six feet high. The hills are spaced about every two feet in the rows. The stakes are driven to a depth of eight to eleven inches, depending upon the consistency of the soil, the depths being sufficient to provide firm setting of the stakes.

The accepted method of setting these stakes has been first to spread them in the field. Following this, the individual stakes are driven or pounded into the ground by hand labor. The cost of setting up stakes in a given area by this method is considerable.

To lessen the cost and management problems involved in the above procedure, various attempts have been made to devise a suitable mechanical stake driver. Among the types of stake drivers heretofore devised are: (1) A piston-type machine which is mounted on one side of a trailer and which pushes the stakes downwardly on the down stroke of the piston; (2) a device employing an air compressor and hammer; (3) a machine operating on the flywheel principle, which is provided with means for clamping the stakes near the bottoms thereof by a set of jaws, and then pushing the stakes into the ground.

The various types of mechanical stake setters referred to above have considerable disadvantages, since they are relatively very expensive and are of considerable bulk, usually requiring mounting on a separate trailer and requiring separate power means.

The stake-setting machine of the present invention is intended to be mounted on a conventional tractor and to obtain its power from the tractor power take-off shaft. The tractor also serves as the carrier for the stakes and for the personnel feeding the stakes to the stake-driving mechanism.

Referring to the drawings, 11 designates a conventional tractor. Secured to the side portions of the tractor frame are the respective longitudinally extending planks 13 and 14. Designated at 15 is the rear wheel axle housing of the tractor. Designated at 16 and 17 are respective downwardly and rearwardly inclined angle bars which are rigidly secured to the rear portion of the tractor frame and extend in parallel relationship therefrom. Secured on the bars 16 and 17 is a transversely extending gear box 18 in which is journaled a shaft 19 carrying the respective bevel gears 20, 21 and 22. Designated at 23 is a bevel gear which is secured to the power take-off shaft 24 of the tractor, said power take-off shaft projecting into the gear box 18, and the gear 23 meshing with the bevel gear 20 on shaft 19. Designated at 25 is a first longitudinally extending shaft journaled in the rear transverse wall of the gear box 18 and carrying a bevel gear 26 which meshes with bevel gear 21, as shown in Figure 4. Designated at 27 is another longitudinally extending shaft journaled in the rear wall of the gear box 18 and carrying a bevel gear 28 which meshes with the bevel gear 22.

Secured to the ends of the angle bar 16 is a first transversely extending, relatively short angle bar 29 which faces upwardly, as shown in Figures 1 and 5, and which is arranged with the planes of its flanges extending, for example, at respective opposite 45-degree angles to the horizontal. Designated at 30 is a gear box which is secured on the angle bar 29 and whose axis is directed upwardly and rearwardly at a 45-degree angle with respect to the horizontal. Secured on the rear portion of the plank 13 is a bracket 31 which has rigidly secured thereto a transversely extending bar member 32 in which is secured a journal bearing 33 aligned with the gear box 30. Designated at 34 is a cylindrical roller having a shaft 35 which is rotatably mounted in the respective units 30 and 33, as shown in Figure 1. The supporting angle bar 29 is braced to the frame of the tractor by a diagonal brace bar 36, one end of the brace bar being secured to the rear end of the bar 16 and the other end being secured to the axle housing 15.

Secured to the rear end of the angle bar 17 is a transversely extending, upwardly facing angle bar 37 in which is slidably positioned a gear box 38 in the upper rear wall of which is journaled the shaft of a second cylindrical roller 39. Secured to the rear end portion of the plank 14 is a transversely extending angle bar 40 having secured to its inner portion a transversely extending channel member 41 which faces the roller 39. The upper end of the shaft of the roller 39 is rotatably received in a bearing block 42 slidably positioned in the channel 41. Rigidly secured in the outer end portion of the channel 41 is a U-shaped stop member 43, and interposed between the stop member 43 and the block 42 is a coil spring 44 which biases the roller 39 toward the roller 34. Similarly, the outer portion of the channel member 37 is provided with an upstanding abutment member 45, and interposed between the abutment member 45 and the journal housing 38 is a coil spring 46 which biases the lower end portion of the roller 39 toward the lower end portion of the roller 34. The inner end portion of the bar member 37 is provided with an upstanding abutment element 47 which limits inward movement of the gear box 38. A similar stop element, shown at 48, is provided in the channel member 41.

The shaft 35 of roller 34 extends rotatably into the gear housing 30 and has secured to its lower end a bevel gear 49. Designated at 50 is a shaft which extends rotatably into the gear box 30 and is connected to the shaft 27 by universal joints 51. Secured to the end of the shaft 50 is a bevel gear 52 which meshes with the bevel gear 49. Similarly, the shaft of the roller 39, designated at 53, carries at its end a bevel gear 54. Designated at 55 is a shaft element which is rotatably supported in a wall of the gear box 38 and which has secured thereon a bevel gear 56 which meshes with the bevel gear 54. The outer end of the shaft 55 is connected to the shaft 25 by a universal joint 57. Referring to Figure 4, it will be apparent that the power take-off shaft 24 rotates the transverse shaft 19 by the cooperation of the bevel gears 23 and 20, whereby the shafts 25 and 27 are rotated in opposite directions by the cooperation of the respective meshing bevel gears 21, 26 and 22, 28. This rotates the drum members 39 and 34 in opposite directions, for example, as viewed from the rear, rotates the drum member 39 clockwise and the drum member 34 counterclockwise.

The drum members 34 and 39 are provided with uniformly spaced, outwardly projecting lugs or pin elements 58 which extend over the entire surfaces of said rollers.

Mounted on the plank 14 and extending alongside the main body of the tractor are respective railings 59 and 60 connected at their forward ends by a transverse railing member 61, thereby defining an enclosure or bin adapted to receive a plurality of stakes 62 in substantially upright, stacked positions, as shown in Figures 1 and 5. The railing elements 59, 60 and 61 may be of any suitable construction, and may be supported on any suitable frame, as for example, upstanding post elements 63 secured to the side margins of the plank 14, and are arranged so as to define a longitudinally extending bin or enclosure which is open at its rear end, whereby access to the stakes 62 may be readily obtained.

In using the machine, the tractor 11 is driven over the rows in which the stakes are to be set, and an operator stands on the plank 14 and feeds stakes into the space between the rollers 34 and 39. The stakes are inserted vertically between the lower portions of the roller surfaces and are gripped by the rollers. In view of the inclined positions of the rollers, the stakes are gripped in the space between the rollers and are automatically driven into the ground in vertical positions while they are moved rearwardly relative to the rollers, the rearward movement of the stakes being at the same rate as that at which the tractor moves forwardly. The projections 58 facilitate the gripping of the stakes between the rollers and prevent the stakes from slipping out of vertical positions as they are being gripped and driven by said rollers. The springs 44 and 46 provide sufficient yieldability for the roller 39 to allow the stakes to be smoothly gripped and held by the roller 39 and still prevent damaging squeezing pressure from being applied to the stakes. The yieldability of the roller 39 also prevents undue wear on the roller surfaces and on the gripping pins 58.

While a specific embodiment of an improved stake-setting machine has been disclosed in the foregoing description, it is to be understood that various modifications within the spirit of the invention may occur to those skilled in the art. Therefore, it is intended that no limitations be placed on the invention except as defined by the scope of the appended claims.

What is claimed is:

1. In combination with a tractor, a stake setting apparatus comprising a pair of parallel rollers inclined downwardly toward the front of the tractor and rotatably mounted on the frame of the tractor and extending parallel to the longitudinal vertical plane of the tractor, and means coupling said rollers to the power takeoff shaft of the tractor, said last named means being arranged to drive said rollers in opposite directions concurrently with the movement of the tractor.

2. In combination with a tractor, a stake setting apparatus comprising a pair of parallel rollers inclined downwardly toward the front of the tractor and extending parallel to the longitudinal vertical plane of the tractor, means rotatably supporting one of said rollers with its axis in a fixed position relative to the tractor frame, yieldable means rotatably supporting the other roller for lateral movement relative to the tractor frame, spring means biasing said other roller toward the first mentioned roller, a plurality of projections on the surface of each roller and spaced uniformly thereover, and means coupling said rollers to the power takeoff shaft of the tractor, said last named means being arranged to drive said rollers in opposite directions concurrently with the movement of the tractor.

3. In combination with a tractor, a stake setting apparatus comprising a pair of parallel rollers inclined downwardly toward the front of the tractor and extending parallel to the longitudinal vertical plane of the tractor, means at the rearward portion of the tractor frame rotatably supporting one of said rollers with its axis in a fixed position relative to the tractor frame, yieldable means at the rearward portion of the tractor frame rotatably supporting the other roller adjacent the first roller for lateral movement relative to the tractor frame, spring means biasing said other roller toward the first mentioned roller, a plurality of projections on the surface of each roller and spaced uniformly thereover, and means coupling said rollers to the power takeoff shaft of the tractor, said last named means being arranged to drive said rollers in opposite directions with the upper portions of said rollers rotating inwardly towards each other, concurrently with the forward movement of the tractor.

NORMAN R. EVONUK.
WALTER E. EVONUK.

REFERENCES CITED

The following references are of record in the file of this patent:

UNITED STATES PATENTS

| Number | Name | Date |
| --- | --- | --- |
| 598,527 | Michael | Feb. 8, 1898 |
| 1,387,944 | Price | Aug. 16, 1921 |
| 1,640,458 | Ledig et al. | Aug. 30, 1927 |
| 2,433,477 | Quinn et al. | Dec. 30, 1947 |